US008926236B2

(12) United States Patent
Kauper et al.

(10) Patent No.: US 8,926,236 B2
(45) Date of Patent: Jan. 6, 2015

(54) DRILLING/REAMING TOOL

(75) Inventors: Herbert Rudolf Kauper, Erlangen (DE); Jurgen Schwaegerl, Vohenstrauss (DE)

(73) Assignee: Kennametal Inc., Latrobe, PA (US)

( * ) Notice: Subject to any disclaimer, the term of this patent is extended or adjusted under 35 U.S.C. 154(b) by 225 days.

(21) Appl. No.: 13/536,212

(22) Filed: Jun. 28, 2012

(65) Prior Publication Data

US 2013/0004253 A1    Jan. 3, 2013

(30) Foreign Application Priority Data

Jul. 2, 2011  (DE) .......................... 10 2011 106 416

(51) Int. Cl.
*B23D 77/00*    (2006.01)
*B23B 51/08*    (2006.01)

(52) U.S. Cl.
CPC ................. *B23B 51/08* (2013.01); *B23D 77/00* (2013.01); *B23B 2251/046* (2013.01); *B23D 2277/52* (2013.01)
USPC .............................. 408/224; 408/230; 408/59

(58) Field of Classification Search
CPC ........ B23D 77/00; B23D 51/02; B23D 51/46; B23D 2251/046; B23D 2251/085
USPC ............. 408/230, 224, 227, 223, 216, 57, 59, 408/229; 407/56, 57, 58, 59
See application file for complete search history.

(56) References Cited

U.S. PATENT DOCUMENTS

| 2,898,612 | A | * | 8/1959 | Hofbaner ........................ 408/216 |
| 2,918,955 | A | * | 12/1959 | Simas ............................. 408/22 |
| 3,667,857 | A | * | 6/1972 | Shaner et al. .................. 408/230 |
| 4,507,028 | A | | 3/1985 | Matsushita |
| 4,957,397 | A | * | 9/1990 | Huff .............................. 408/224 |
| 5,221,163 | A | * | 6/1993 | Nishimura ...................... 407/53 |
| 5,354,155 | A | | 10/1994 | Adams |
| 5,636,948 | A | * | 6/1997 | Rexius .......................... 408/224 |
| 6,045,301 | A | * | 4/2000 | Kammermeier et al. ....... 408/57 |
| 6,231,281 | B1 | * | 5/2001 | Nishikawa ..................... 408/222 |
| 6,379,090 | B1 | * | 4/2002 | Halley et al. .................. 408/227 |
| 7,207,752 | B2 | * | 4/2007 | Schulte ......................... 408/224 |
| 7,871,224 | B2 | * | 1/2011 | Dost et al. ..................... 408/211 |

(Continued)

FOREIGN PATENT DOCUMENTS

CN   2283538 Y       6/1998
DE    902101 A   *  8/1945

(Continued)

OTHER PUBLICATIONS

German Patent Office, "Office Action", May 2, 2012, 5 pp.

*Primary Examiner* — Eric A Gates
*Assistant Examiner* — Paul M Janeski
(74) *Attorney, Agent, or Firm* — Larry R. Meenan, Esq.

(57) ABSTRACT

A drilling/reaming tool includes a basic body which extends in a longitudinal direction. The basic body includes at least one end-side drilling major cutting edge, a main flute which is assigned to said drilling major cutting edge and is wound at a first helix angle, and a plurality of reaming cutting edges which are arranged circumferentially on the basic body and have in each case one reamer flute which is assigned to the respective reaming cutting edge and is wound at a second helix angle. The reaming cutting edges adjoin the at least one major cutting edge directly in the longitudinal direction. Each reamer flute is merged into the main flute.

14 Claims, 3 Drawing Sheets

(56) References Cited

U.S. PATENT DOCUMENTS

| | | |
|---|---|---|
| 2007/0286693 A1 | 12/2007 | Cho et al. |
| 2007/0298280 A1 | 12/2007 | Omori |
| 2009/0080989 A1 | 3/2009 | Dost et al. |
| 2009/0116919 A1 * | 5/2009 | Dost et al. .................... 408/214 |
| 2010/0329802 A1 * | 12/2010 | Wada et al. .................... 408/1 R |
| 2011/0164937 A1 * | 7/2011 | Byrne et al. .................... 408/200 |
| 2013/0058734 A1 * | 3/2013 | Volokh .......................... 408/223 |

FOREIGN PATENT DOCUMENTS

| | | | |
|---|---|---|---|
| DE | 19735024 B4 | * | 9/2006 |
| DE | 101 44 241 B4 | | 4/2008 |
| DE | 102011106416 A1 | | 1/2013 |
| DE | 102012009328 B3 | * | 8/2013 |
| GB | 25179 | | 0/1907 |
| JP | 52-81789 | | 7/1977 |
| JP | 58181508 A | * | 10/1983 |
| JP | 59205211 A | * | 11/1984 |
| JP | 60094211 A | * | 5/1985 |
| JP | 61-100306 | | 5/1986 |
| JP | 2006-95662 A | | 4/2006 |
| WO | WO 2011065901 A1 | * | 6/2011 |

* cited by examiner

DRILLING/REAMING TOOL

BACKGROUND

1. Field of the Invention

The invention relates generally to rotary cutting tools used to perform drilling/reaming operations.

2. Background Information

An example of a tool upon which the present invention improves is shown, for example, in DE 101 44 241 B4. The drilling/reaming tool which is described in said document has two (drilling) major cutting edges which are in each case assigned a helical main flute which is machined into a basic body of the tool. In addition, three reaming cutting edges which are spaced apart from one another in the circumferential direction are provided on the circumferential side, which reaming cutting edges project somewhat beyond the major cutting edges in the radial direction. Here, the reaming cutting edges adjoin the major cutting edges directly. Each reaming cutting edge is assigned a reamer flute which is likewise formed in a helically extending manner in a land of the basic body between the two main flutes.

Drilling/reaming tools of this type serve for the production of a drilled hole and for the simultaneous finishing operation of the hole wall with the aid of the reaming cutting edges. The key here is machining which is as highly precise as possible, in order to achieve the desired surface quality of the hole wall. Here, inter alia, effective transporting away of chips is also decisive. It is to be avoided here, in particular, that a chip is jammed between the wall of the hole and the tool, which would lead to damage of the wall of the machined hole. Here, transporting away of chips becomes more difficult as the depth of the drilled hole increases.

There is thus room for improvements in rotary cutting tools used to perform drilling/reaming operations.

SUMMARY OF THE INVENTION

The present invention improves upon the prior art by providing an improved drilling/reaming tool that, among other things, provides improved transportation of chips produced during cutting operations.

According to an aspect of the invention, a rotary cutting tool is provided. The rotary cutting tool comprises a basic body which extends in the longitudinal direction and at least one, preferably two or more drilling major cutting edges on its end side, which drilling major cutting edges are in each case assigned a main flute which is wound at a first helix angle. Reaming cutting edges which are arranged on the circumferential side are provided directly in the region of the end side, that is to say the drill tip, which reaming cutting edges protrude radially beyond the major cutting edges and therefore carry out a finishing operation on a wall of a drilled hole which is formed by the major cutting edges. Here, each reaming cutting edge is assigned a reamer flute. For effectively transporting away the removed chips, in particular the reaming chips which are removed by the reaming cutting edges, it is provided that the reamer flutes are merged into the main flutes, that is to say the reamer flutes are connected to the main flutes. For transporting away the chips, it is therefore not required that the reamer flutes, unlike the main flutes, are formed over the entire length of a cutting part of the tool. In comparison with the main flutes, the reamer flutes therefore extend only over a limited axial length.

As a result of such arrangement, the comparatively small reaming chips have to be guided in the reamer flutes only over a small axial length. In particular in the case of relatively deep drilled holes, the reaming chips are then guided away in the usually considerably larger main flute, as a result of which the risk of chips backing up and therefore also jamming of the reaming chips between the hole wall and the tool is avoided. During operation, the reaming chips are therefore preferably transported away first of all in the reamer flutes approximately in the axial direction and are subsequently guided into the main flute, where they are then transported further away together with the drilling chips which are formed by the major cutting edges.

It is of particular significance that the reaming cutting edges adjoin the major cutting edges directly in the axial direction. Here, directly is understood as meaning that no spacing or at any rate a small axial spacing lies between the axially rearmost part of the major cutting edge (cutting corner) and the axially frontmost reaming cutting edge. In an example embodiment the axial spacing is at most 1.0 times the nominal diameter of the tool, in particular at most 0.1 times the nominal diameter.

Here, the reaming cutting edges extend radially to the outside and are oriented, in particular, to the outside perpendicularly with respect to the longitudinal axis. The individual reaming cutting edges usually end on the same radial circumference, and therefore have the same radius. This defines the tool nominal diameter.

For effective transporting away of chips, the main flute and the reamer flutes preferably have the same helix orientation. The flutes are therefore preferably not configured in opposite directions to one another, since, in this case and in the case of drilling into solid material, if the reaming chips are combined with the main chips, the risk of chips backing up would exist on account of the different directions of flow.

According to an example embodiment of the invention, the two helix angles are different from one another. Here, in particular, the second helix angle of the reamer flute is smaller than the first helix angle, with the result therefore that the reamer flutes successively approach the main flute which is assigned to them in each case and ultimately open into the main flute.

Here, the first helix angle of the main flute preferably lies in the range from 15° to 40° and typically at approximately 30°, and the second helix angle lies in the range from 0° to 20°, preferably at approximately 10°.

In an example embodiment, the reamer flutes are limited only to a front region of the tool, that is to say they extend only over a short axial length. The axial length preferably lies in the range from one to four times the tool nominal diameter.

The tool can both be configured as a single-piece shank tool, in which the major cutting edges, the drill tip, the reaming cutting edges and the reamer flutes are machined in a single-piece basic body. As an alternative, the tool can also be of modular construction, in which a drilling/reamer head is inserted into a basic body. Here, the reamer head can be inserted exchangeably or else can be brazed in.

In an example embodiment of a modular tool in accordance with the present invention, a reamer head is configured which carries the major cutting edges and the reaming cutting edges and the reamer flutes, and which is adjoined in the longitudinal direction by a rearward part of the tool basic body which has a reduced diameter in comparison with the reamer head, with the formation of a shoulder. The reamer head and the rearward part therefore merge into one another via a recessed shoulder. In this design variant, it is provided that the reamer flutes open into said shoulder and end there. It is not necessarily required here that the reamer flutes meet the main flute and intersect with it. In this design variant, the reaming chips can pass into an annular space which is formed during operation between the hole wall and the rearward radially recessed part of the basic body in the circumferential direction to the main flute and are then guided away in the latter. In this case, the annular space therefore forms a connecting flute space between the reamer flutes and the main flutes.

It is provided, in particular, in this design variant that the helix angle of the reamer flutes is also greater than that of the flute.

In an example embodiment, the main flutes and the reamer flutes are wound in the same direction, that is to say they both have, for example, a positive helix angle. As a result, the chips are transported away in the two flute types in the same direction and the reaming chips are guided into the main flute.

In an example embodiment, the main flutes and the reamer flutes are wound in opposite directions, that is to say the main flutes have, for example, a positive helix angle (greater than or equal to 0°) and the reamer flutes have a negative helix angle (less than 0°), preferably in the range down to −40°. As a result, the chips in the two flute types are transported away in different axial directions. This refinement is advantageous, in particular, for workpieces which are provided with through holes. As a result of a negative helix angle of the reamer flutes, the reaming chips are transported away to the front, that is to say in the drilling direction.

In order to ensure as satisfactory a surface quality of the wall of the hole as possible, high run-out and the avoidance of what is known as a "juddering movement" are required. To this end, an unequal pitch, in particular of the reaming cutting edges, is preferably provided in general, in order to avoid resonance-like building up of vibrations during the drilling operation. In order to form the unequal pitch, different numbers of reaming cutting edges are formed on the respective lands between the main flutes. Typically, for example, at least two or three reaming cutting edges are formed on the first land and three or four reaming cutting edges are formed on the second land. The numbers of reaming cutting edges preferably differ only by one reaming cutting edge.

As an alternative or in addition to this, it is provided that the lands sweep over a different angular portion, that is to say they have a different circumferential line. This is equivalent to an unequal pitch of the major cutting edges; the latter therefore have different angular spacings from one another. In the case of two major cutting edges, this difference is, for example, from 5° to 10°. In the case of two cutting edges, the angular spacing is therefore (in the case of uniform distribution), instead of the usual 180°, from 185° to 190° on one side and from 170° to 175° on the other side.

In principle, any combinations of unequal and equal pitch of the number and distribution of the reaming cutting edges are possible.

In an example embodiment, the first reaming cutting edge which adjoins the major cutting edge in the circumferential direction is recessed axially with regard to the further reaming cutting edges. In general, it is provided in one expedient refinement that the reaming cutting edges are configured and arranged in such a way that they have an at least similar cutting performance and are therefore loaded equally during operation in the case of a predefined feed during cutting machining.

Since the first reaming cutting edge is assigned in a leading manner the main flute, the first reaming cutting edge would have to have a comparatively high cutting performance, if it were situated at the same axial height as the further reaming cutting edges. Here, the axial offset between the first reaming cutting edge and the following second reaming cutting edge preferably corresponds at least approximately to a proportionate axial feed which the drilling tool covers in the case of correct use with a defined feed over the rotary angle, over which the main flute sweeps. The axial offset between the first and the second reaming cutting edges typically lies in the range from 0.005 to 2 mm (in the case of drilling nominal diameters in the range from 3 to 70 mm).

Coolant channels which open at first openings on the end side are preferably formed in the tool basic body. In addition, circumferential-side second openings are provided in the respective reamer flutes close to the reaming cutting edges, in addition to the end-side first openings, with the result that, in addition, coolant is also provided directly at the reaming cutting edges in an effective way. Here, the second openings in the reamer flutes are preferably connected to the (main) coolant channels via channels, in particular in the manner of branch channels or branch bores. Here, the direct arrangement of the reaming cutting edges on the end side and of both the first and second outlet openings achieves cooling of the entire reamer head in an overall very effective and efficient manner, that is to say of the frontmost region of the tool, in which the reamer flutes are formed.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

A full understanding of the invention can be gained from the following description of the preferred embodiments when read in conjunction with the partially schematic figures in which.

DESCRIPTION OF EXAMPLE EMBODIMENTS

Figure 1:
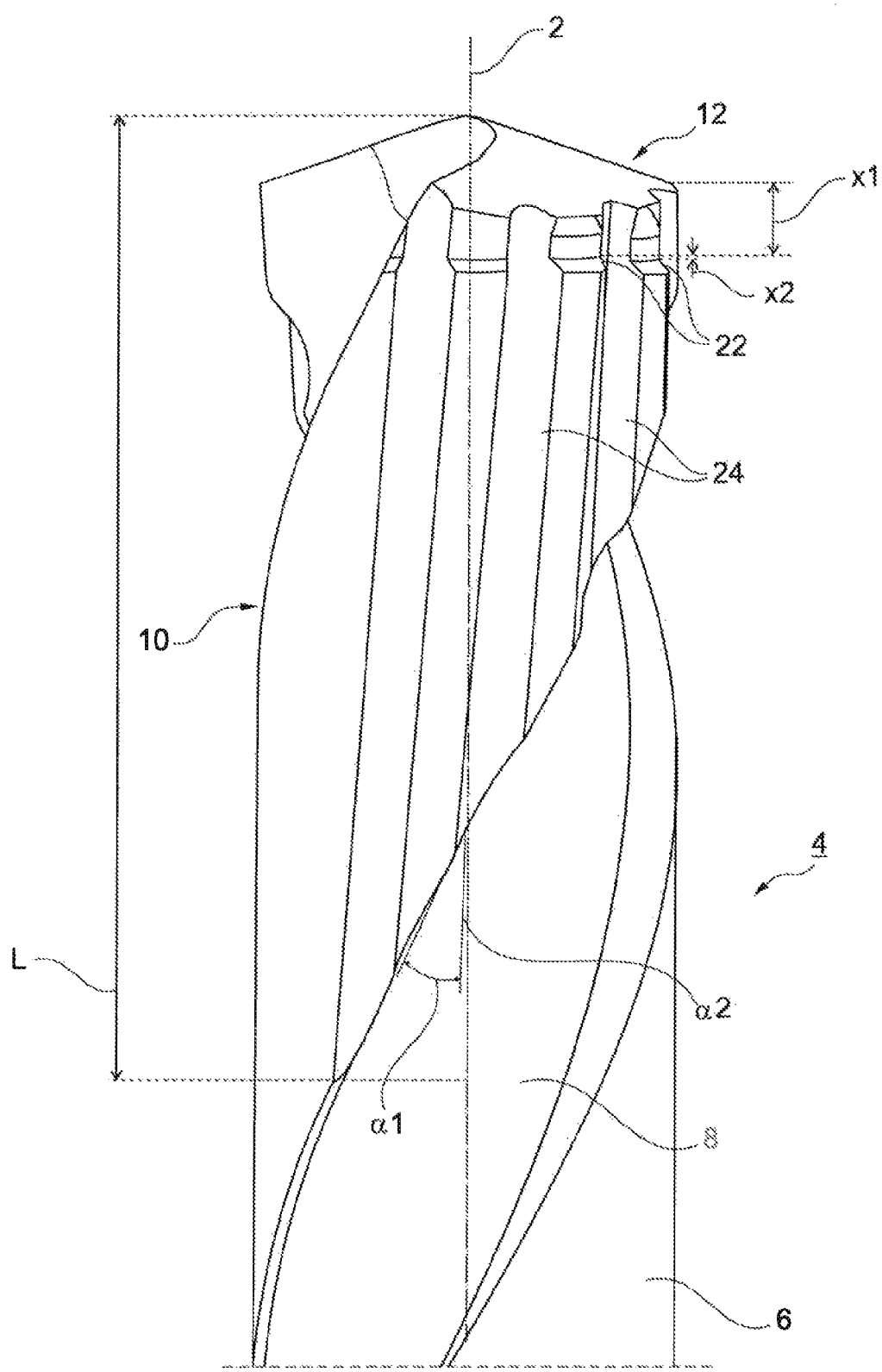
FIG. 1 shows a side view of details of a drilling/reaming tool.

Directional phrases used herein, such as, for example, left, right, front, back, top, bottom and derivatives thereof, relate to the orientation of the elements shown in the drawings and are not limiting upon the claims unless expressly recited therein. Identical parts are provided with the same reference number in all drawings.

Figure 2:
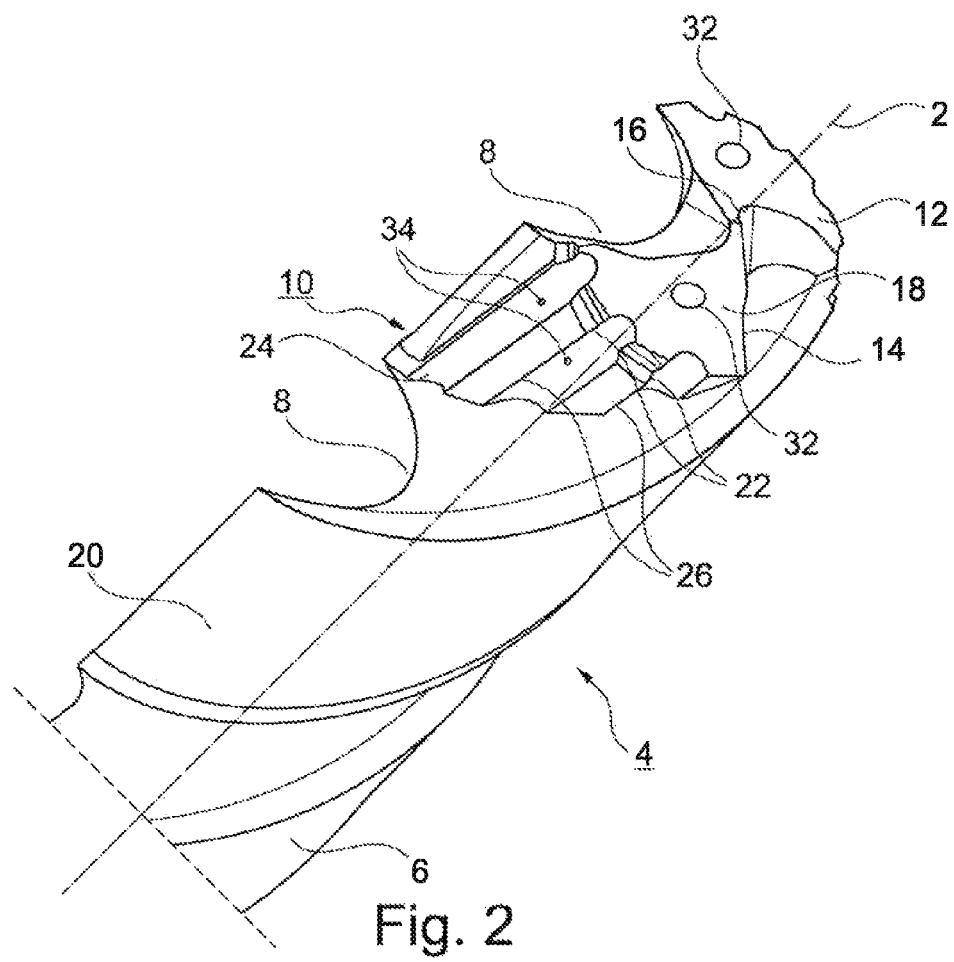
FIG. 2 shows a perspective illustration of details of a drilling/reaming tool.
Figure 3:
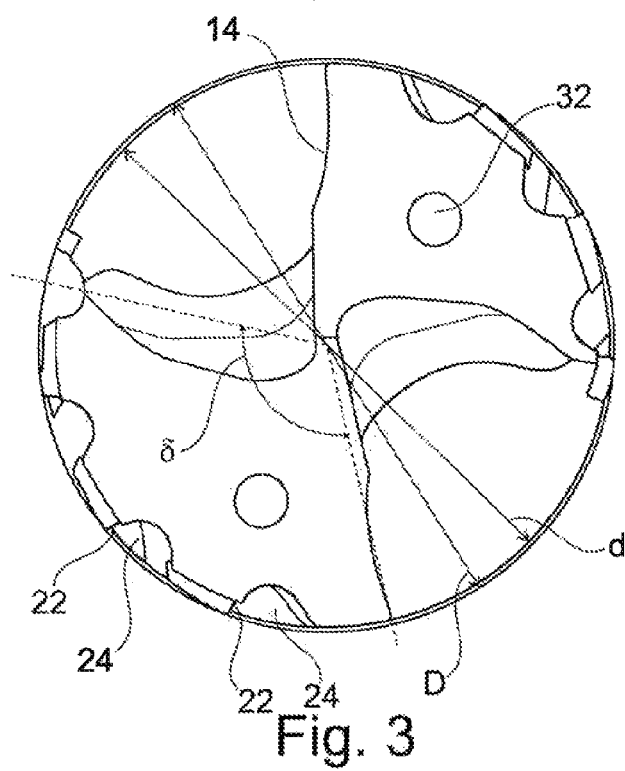
FIG. 3 shows an end view of a drilling/reaming tool.

Referring to FIGS. 1-3, a drilling/reaming tool 4, called a tool for short in the following text, which extends in the longitudinal direction 2 has a basic body 6 which extends in the longitudinal direction 2 and in which, in the exemplary embodiment, two main flutes 8 are made which are wound at a first helix angle α1. In the front region, the tool 4 has a reamer head 10. On its end side, the reamer head 10 is configured as a drill tip 12 which, in the exemplary embodiment, has two major cutting edges 14 (FIGS. 2 and 3) which are connected to one another in the drill center via a chisel edge 16 (FIG. 2). The respective major cutting edge 14 is adjoined in the circumferential direction by a clearance land 18 (FIG. 2) which, in the exemplary embodiment, is configured in the shape of a cone envelope and extends in each case as far as the main flute 8 which is assigned to the following major cutting edge 14. In addition, the fluted region of the basic body 6 is adjoined by a shank (not shown), by way of which the tool 4 is clamped into a tool fitting of a metal-cutting machine.

Referring to FIG. 2, a land 20 is defined between the main flutes 8, in which land 20 subsequently a plurality of reaming cutting edges 22 are formed in the region of the reamer head 10 on the circumferential side in the frontmost region, such that they adjoin the drill tip 12 directly. As can be seen, in particular, from FIGS. 1 and 2, the reaming cutting edges 22 are arranged such that they are recessed somewhat in the longitudinal direction 2 from the clearance land 18 which is in the shape of a cone envelope. Here, the axial offset x1 between the radially outermost end of the major cutting edge 14 and the first reaming cutting edge 22 lies in the range of only a few mm, that is to say a fraction (less than 20%) of a nominal diameter D (FIG. 3) of the tool 4.

The reaming cutting edges 22 extend in each case substantially approximately in the radial direction and are oriented approximately perpendicularly with respect to the longitudinal direction 2. Here, the reaming cutting edges 22 define the nominal diameter D of the tool 4. Here, all the reaming cutting edges 22 lie on the same nominal diameter D. In contrast, the major cutting edges 14 of the drill tip 12 reach merely as far as a drill diameter d (FIG. 3) which is slightly smaller than the nominal diameter D. Here, the nominal diameter D is typically approximately from 0.2 to 1 mm larger than the drill diameter d.

Each reaming cutting edge 22 is assigned a reamer flute 24 which is made in the basic body 6 and is configured so as to be wound at a second helix angle $\alpha 2$. A respective reaming cutting edge 22 is adjoined in each case by a reaming minor cutting edge 26 (FIG. 2) which extends along the respective reamer flute 24. Accordingly, a main minor cutting edge (not shown here in greater detail) is also provided adjacently to a respective major cutting edge 14.

As can be seen, in particular, from FIG. 1, the two helix angles $\alpha 1$, $\alpha 2$ are configured to be different, that is to say the flutes 8, 24 do not run parallel to one another. Here, it is provided in the exemplary embodiment of FIGS. 1 to 3 that the first helix angle $\alpha 1$ of the main flutes 8 is considerably greater than the second helix angle $\alpha 2$ of the reamer flutes 24. In the exemplary embodiment, the first helix angle $\alpha 1$ lies approximately in the region of 30° and the second helix angle $\alpha 2$ lies approximately in the region of approximately 10°. In general, the two helix angles differ approximately by the factor of from 2 to 4.

In the exemplary embodiment of FIGS. 1 to 3, this measure achieves a refinement, in which the individual reamer flutes 24 open into the respective main flute 8, that is to say intersect the latter as it were. On account of the helical shape, this takes place at different axial lengths. Here, the axial length L of the reamer head 10 is defined by the frontmost region of the drill tip 12, that is to say the chisel edge 16 in the exemplary embodiment and in the rearward part by the end of the longest reamer flute 24 when the latter therefore merges into the main flute 8. Here, the axial length L of the reamer head 10 preferably lies in the range of from 2 times to 3 times the nominal diameter D.

Figure 4:
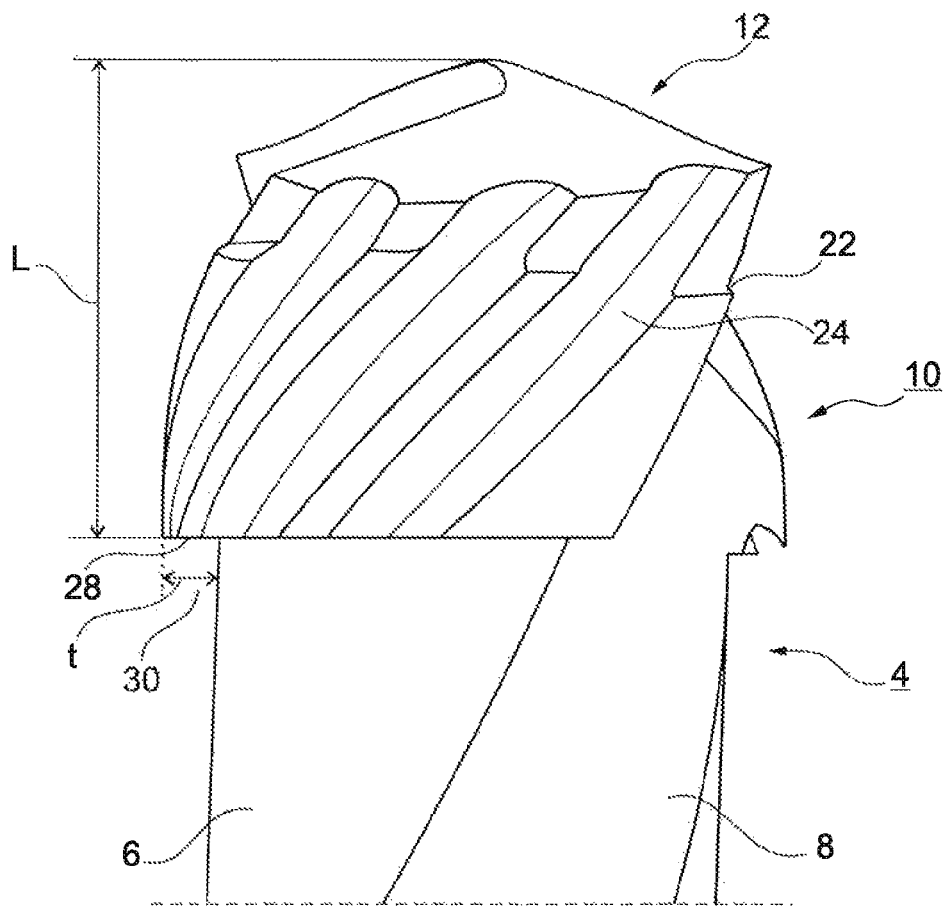
FIG. 4 shows a side view of details of a second design variant of a drilling/reaming tool.

In contrast to the single-piece tool 4 according to FIGS. 1 to 3, the second design variant according to FIG. 4 is also configured, in particular, for modular tools 4, in which the reamer head 10 can be inserted into the basic body 6, for example, as an exchangeable wear part. As an alternative, the reamer head 10 is fastened in the basic body 6 irreversibly, for example by brazing. In this design variant, the reamer flutes 24 all end at an identical axial length which at the same time defines the axial length L of the reamer head 10.

As can be seen from FIG. 4, the reamer head 10 has a greater diameter than a rearward part of the basic body 6, which rearward part adjoins the reamer head 10. A recessed shoulder 28 is therefore formed between the reamer head 10 and said rearward part. Here, the radial depth t of the shoulder 28 is greater than or equal to the radial depth of the respective reamer flutes 24. In particular, the radial depth t lies approximately in the range from 0.3 to 2 mm and is generally a fraction of the nominal diameter (for example, approximately from 2 to 6% of the nominal diameter D).

In the exemplary embodiment of FIG. 4, it is provided in addition that the second helix angle $\alpha 2$ is greater than the first helix angle $\alpha 1$, and the reamer flutes 24 therefore do not run toward the main flutes 8 and therefore also do not intersect the latter.

A common feature of both design variants is that, during operation, in which the tool 4 rotates about the longitudinal direction 2, reaming chips which are produced by the reaming cutting edges 22 are guided away in the reamer flutes 24 and are transferred into the main flutes 8. In the exemplary embodiment of FIGS. 1 to 3, this takes place by the reamer flutes 24 opening directly into the main flutes 8. In the exemplary embodiment of FIG. 4, this takes place indirectly via the clearance 30 which is defined by the shoulder 28 and forms an annular space with respect to a drilled hole wall during operation. The reaming chips pass into said annular space at the end of the reamer head 10 when they exit out of the reamer flute 24. As a result of the further rotation of the tool 4, they subsequently pass into the respective main flute, that is to say they are taken along by the latter for further chip discharge.

The special advantage of the refinement which is described here is to be seen in the fact that the reaming chips which are considerably smaller than the main chips which are produced by the (drilling) major cutting edges 14 are guided in the reamer flutes 24 only over a very short axial length and are subsequently guided away further together with the main chips in the considerably larger main flutes 8. This achieves effective transporting away of chips. In particular, in the case of great axial lengths of the tool, for example in the case of tools with an axial length which is greater than from 4 times to 5 times the nominal diameter D, the risk of chips backing up in the reamer flutes 24 is avoided. In particular the risk is also avoided that the reaming chips become jammed between the reaming minor cutting edges 22 and the hole wall and therefore damage the machined hole wall.

In particular, long tools 4 of this type often tend to what is known as rattling, that is to say the tool oscillates in an undesired manner during operation, which leads to undesired chatter marks in the hole wall.

In order to keep this inclination to rattle as low as possible, an unequal pitch of the reaming cutting edges 22 is provided. To this end, in the example embodiment, the number of reaming cutting edges is different on the two lands 20, which is assisted by different lengths (in the circumferential direction) of the lands 20. The angular spacing between reaming cutting edges 22 which follow one another is preferably different from one another, and reaming cutting edges 22 which are assigned to one another, that is to say, for example, the respectively first reaming cutting edges 22 which follow the respective major cutting edge 14, are not arranged so as to lie exactly opposite one another (at an angle of 180°). In addition, furthermore, an unequal pitch of the major cutting edges 14 is also provided in the exemplary embodiment, that is to say said major cutting edges 14 are also arranged with respect to one another at a rotary angle which is not equal to 180°.

In the exemplary embodiment of FIG. 3, the lands extend over an angular portion δ, starting from the respective major cutting edge 14 as far as to the beginning of the flute. In the exemplary embodiment, the angle δ for the larger land 20 lies at approximately 115° and that for the shorter land lies at approximately 85°. Four reaming cutting edges 22 are provided on the longer land and three reaming cutting edges 22 are provided on the shorter land.

In order to achieve uniform loading of the reaming cutting edges 22, it is provided, furthermore, that the first reaming cutting edge 22 which follows the respective major cutting edge 14 is arranged offset in a rearward manner by an axial offset x2 (FIG. 1) with regard to the second reaming cutting edge 22. Here, this offset x2 in relation to the axial height of the following reaming cutting edge 22 lies approximately in the range from 0.005 to 2 mm. In FIG. 1, this shoulder is only indicated and is not true to scale. As a result, the cutting performance to be carried out during correct operation by the first reaming cutting edge 22 is reduced and is adapted to the cutting performance of the following reaming cutting edge 22. On account of the main flute 8 which leads the first reaming cutting edge 22, the reaming cutting edge 22 would otherwise have to carry out a considerably greater cutting performance for a defined feed. Here, the axial offset x2 is selected, in particular, in such a way that, in the case of a correct feed, for which the tool 4 is designed, the cutting performances of the reaming cutting edges 22 are largely identical. The following reaming cutting edges 22 are preferably situated at an identical axial height.

Furthermore, a cooling means is provided in the exemplary embodiment for a high cutting performance. To this end, cooling channels which run in the solid material of the respective land 20 are machined in the basic body 6. The cooling channels exit at end-side first openings 32 on the end side of the drill tip 12. From the cooling channels, in the region of the reamer head 10, branch channels or bores (not shown in greater detail) lead into the respective reamer flutes 24 and exit there at second openings 34 in the flute bottom of the respective reamer flute 24 (see FIG. 2).

Figure 5:
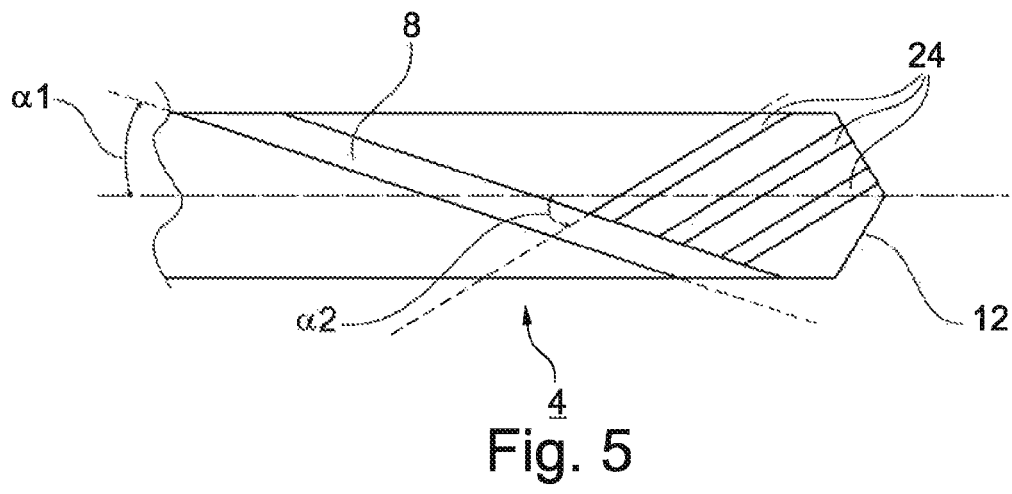
FIG. 5 shows a diagrammatic side view of a further design variant.

FIG. 5 diagrammatically shows a further design variant, in which the main flute 8 and the reamer flutes 24 are oriented in opposite directions to one another, that is to say the main flute 8 is oriented at a positive first helix angle α1 and the reamer flutes 24 are oriented at a negative second helix angle α2. A design variant of this type is used for workpieces with, for example, precast through holes. During operation, the reaming chips are conveyed forward toward the drill tip, whereas the drilling chips are guided away to the rear in the main flute 8.

While specific example embodiments of the invention have been described in detail, it will be appreciated by those skilled in the art that various modifications and alternatives to the details provided herein could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A drilling/reaming tool comprising:
    a basic body which extends in a longitudinal direction and includes:
        at least two end-side drilling major cutting edges spaced circumferentially such that one major cutting edge follows the other major cutting edge upon rotation of the tool;
        at least two main flutes, each assigned to a respective one of the major cutting edges and wound at a first helix angle;
        a clearance land adjoining each major cutting edge in the circumferential direction and extending to the main flute assigned to the major cutting edge which follows;
        a land defined between the two main flutes which extends to the clearance land; and
        at least three reaming cutting edges arranged circumferentially in the land such that one reaming cutting edge leads and at least two follow upon rotation of the tool and have in each case one reamer flute which is assigned to the respective reaming cutting edge and is wound at a second helix angle,
    wherein each reamer flute extends from the clearance land and merges into one of the main flutes.

2. The drilling/reaming tool of claim 1 wherein the first helix angle is different than the second helix angle.

3. The drilling/reaming tool of claim 1 wherein the second helix angle is smaller than the first helix angle, and each reamer flute opens into the main flute.

4. The drilling/reaming tool of claim 1 wherein the first helix angle lies in the range of from about 15° to about 40° and the second helix angle lies in the range of from about 0° to about 20°.

5. The drilling/reaming tool of claim 1 wherein the first helix angle is approximately 30° and the second helix angle is approximately 10°.

6. The drilling/reaming tool of claim 1 wherein the basic body has a nominal diameter and wherein the reamer flutes are merged into the main flute at an axial length in the range from 0.1 times to 4 times the nominal diameter.

7. The drilling/reaming tool of claim 1 wherein a reamer head is configured which carries the major cutting edges and the reaming cutting edges and which is adjoined in the longitudinal direction by a part of the basic body, the part having a reduced diameter in comparison with the reamer head, wherein the reamer head includes a shoulder formed by the difference in diameter, and wherein the reamer flutes open into the shoulder.

8. The drilling/reaming tool of claim 1 wherein the reamer flutes are wound in the opposite direction to the main flute.

9. The drilling/reaming tool of claim 1 wherein the reaming cutting edges have an unequal pitch.

10. The drilling/reaming tool of claim 1 wherein the reaming cutting edge which leads the other reaming cutting edges is recessed in the longitudinal direction away from the major cutting edges in relation to the following reaming cutting edge.

11. The drilling/reaming tool of claim 1 wherein the plurality of reaming cutting edges are arranged in such a way that each of the reaming cutting edges is generally uniformly loaded during operation for a defined feed.

12. The drilling/reaming tool of claim 1 wherein coolant channels which exit at end-side first openings are formed in the basic body.

13. The drilling/reaming tool of claim 12 wherein circumferential-side second openings which are connected to the coolant channels are formed in the basic body, the second openings being structured to provide a coolant in the reamer flutes.

14. The drilling/reaming tool of claim 1 wherein an end of each of the at least two reaming cutting edges which follow the other reaming cutting edge are disposed at generally the same axial height.

* * * * *